United States Patent
Grzeskowiak, II et al.

(10) Patent No.: US 12,030,260 B1
(45) Date of Patent: Jul. 9, 2024

(54) STONE SLABS, SYSTEMS, AND METHODS

(71) Applicant: Cambria Company LLC, Eden Prairie, MN (US)

(72) Inventors: Jon Louis Grzeskowiak, II, Prior Lake, MN (US); Martin E. Davis, Excelsior, MN (US)

(73) Assignee: Cambria Company LLC, Eden Prairie, MN (US)

( * ) Notice: Subject to any disclaimer, the term of this patent is extended or adjusted under 35 U.S.C. 154(b) by 412 days.

(21) Appl. No.: 17/139,914

(22) Filed: Dec. 31, 2020

Related U.S. Application Data

(60) Provisional application No. 62/956,611, filed on Jan. 2, 2020.

(51) Int. Cl.
*B29C 69/02* (2006.01)
*B29K 709/00* (2006.01)
*B29K 709/06* (2006.01)

(52) U.S. Cl.
CPC .......... *B29C 69/02* (2013.01); *B29K 2709/06* (2013.01); *B29K 2709/14* (2013.01)

(58) Field of Classification Search
CPC ....... B29C 70/84; B29C 70/845; B29C 65/70; B29C 45/14; B29C 45/14467
USPC ................................. 264/259, 261
See application file for complete search history.

(56) References Cited

U.S. PATENT DOCUMENTS

| | | | |
|---|---|---|---|
| 178,308 A | 6/1876 | Leathers et al. | |
| 1,212,331 A | 1/1917 | Denivelle | |
| 1,474,817 A | 11/1923 | Fincke | |
| 1,485,810 A | 3/1924 | Parker, Jr. et al. | |
| 1,568,070 A | 1/1926 | Jennens | |
| 1,570,538 A | 1/1926 | Thomas | |
| 1,711,701 A | 5/1929 | Speck | |
| 1,939,045 A | 12/1933 | Fredriksen | |
| 2,280,488 A | 4/1942 | Jenkins et al. | |
| 2,474,654 A | 6/1949 | Carlson | |
| 2,556,486 A | 6/1951 | Smith | |
| 3,013,370 A | 12/1961 | Vida | |
| 3,088,713 A | 5/1963 | Gard | |
| 3,164,647 A | 1/1965 | Fischler | |

(Continued)

FOREIGN PATENT DOCUMENTS

| | | |
|---|---|---|
| CA | 2896383 | 7/2017 |
| CH | 190667 | 7/1937 |

(Continued)

OTHER PUBLICATIONS

"Cambria introduces the new costal collection," [press release] Feb. 4, 2014, 2 pages.

(Continued)

*Primary Examiner* — Jeffrey M Wollschlager
*Assistant Examiner* — Xue H Liu
(74) *Attorney, Agent, or Firm* — Fish & Richardson P.C.

(57) ABSTRACT

This document describes slab products, and systems and methods of forming slab products. Some example methods include placing a first slab section having a first surface within an enclosure, arranging a second surface of a second slab section adjacent the first surface within the enclosure, such that a seam is defined between the first surface and the second surface, sealing the enclosure, providing a resin at an inlet of the enclosure, and flowing the resin through the seam.

16 Claims, 14 Drawing Sheets

(56) References Cited

U.S. PATENT DOCUMENTS

| | | |
|---|---|---|
| 3,177,279 A | 4/1965 | Bilodeau |
| 3,245,129 A | 4/1966 | Entz |
| 3,245,648 A | 4/1966 | Johansson et al. |
| 3,255,024 A | 6/1966 | Alexander et al. |
| 3,578,276 A | 5/1971 | Soderlund |
| 3,628,766 A | 12/1971 | Hartmann |
| 3,670,060 A | 6/1972 | Cuffaro et al. |
| 3,712,825 A | 1/1973 | Yocum |
| 3,743,235 A | 7/1973 | Shelley |
| 3,819,436 A | 6/1974 | Allen |
| 3,843,089 A | 10/1974 | Scholz et al. |
| 3,904,791 A | 9/1975 | Iverson et al. |
| 3,990,212 A | 11/1976 | Flodin |
| 4,094,941 A | 6/1978 | Manners et al. |
| 4,254,077 A | 3/1981 | Fontana et al. |
| 4,388,975 A | 6/1983 | Hirano |
| 4,421,466 A | 12/1983 | Heitzman |
| 4,466,500 A | 8/1984 | Mosher et al. |
| 4,484,645 A | 11/1984 | Inoue |
| 4,680,155 A | 7/1987 | Rochefort et al. |
| 4,698,010 A | 10/1987 | Toncelli |
| 4,914,870 A | 4/1990 | Toncelli |
| 5,022,193 A | 6/1991 | Toncelli |
| 5,080,085 A | 1/1992 | Lovato |
| 5,266,253 A | 11/1993 | Dijkhuizen et al. |
| 5,445,772 A | 8/1995 | Uchida |
| 5,662,847 A | 9/1997 | Uchida et al. |
| 5,664,305 A | 9/1997 | Lawton et al. |
| 5,670,007 A | 9/1997 | Toncelli |
| 5,679,298 A | 10/1997 | Uchida et al. |
| 5,795,513 A | 8/1998 | Austin |
| 5,813,183 A | 9/1998 | Attley |
| 5,885,503 A | 3/1999 | Bordener |
| 6,103,160 A | 8/2000 | Uchida |
| 6,205,727 B1 | 3/2001 | Toncelli |
| 6,237,294 B1 | 5/2001 | Rygiel |
| 6,461,552 B1 | 10/2002 | Geiger |
| 6,517,915 B1 | 2/2003 | Banus |
| 6,572,802 B1 | 6/2003 | Austin |
| 6,773,641 B1 | 8/2004 | Toncelli |
| 7,413,694 B2 | 8/2008 | Waldrop |
| 7,727,435 B2 | 6/2010 | Ghahary |
| 7,771,680 B2 | 8/2010 | Gordienko |
| 7,815,827 B2 | 10/2010 | Cruz |
| 7,883,657 B2 | 2/2011 | Pridie |
| 8,030,441 B2 | 10/2011 | Toncelli |
| 8,101,113 B2 | 1/2012 | Castonguay et al. |
| 8,158,548 B2 | 4/2012 | Di Noto et al. |
| 8,333,916 B2 | 12/2012 | Jamrussamee et al. |
| 8,398,954 B2 | 3/2013 | Gordienko |
| 8,436,075 B2 | 5/2013 | Buskila et al. |
| 8,636,941 B1 | 1/2014 | Ciuperca |
| 8,702,886 B2 | 4/2014 | Yaniv et al. |
| 9,186,819 B1 | 11/2015 | Grzeskowiak, II et al. |
| 9,289,923 B1 | 3/2016 | Grzeskowiak, II et al. |
| 9,427,896 B1 | 8/2016 | Xie |
| 9,511,516 B2 | 12/2016 | Xie |
| 9,671,274 B1 | 6/2017 | Xie |
| 9,707,698 B1 | 7/2017 | Xie |
| 2002/0081388 A1 | 6/2002 | Batliner et al. |
| 2004/0032044 A1 | 2/2004 | Toncelli |
| 2004/0175514 A1 | 9/2004 | Stiattest |
| 2005/0013991 A1 | 1/2005 | Yang |
| 2006/0101752 A1 | 5/2006 | Sakai et al. |
| 2006/0193693 A1 | 8/2006 | Congdon |
| 2007/0057408 A1 | 3/2007 | Sandqvist et al. |
| 2007/0216058 A1 | 9/2007 | Carreras-Maldonado et al. |
| 2008/0113123 A1 | 5/2008 | Izzo |
| 2008/0153688 A1 | 6/2008 | Borens et al. |
| 2008/0315448 A1 | 12/2008 | Cruz |
| 2009/0105391 A1 | 4/2009 | Buskila et al. |
| 2010/0048772 A1 | 2/2010 | Moore |
| 2010/0159220 A1 | 6/2010 | Toncelli |
| 2010/0194005 A1 | 8/2010 | Toncelli |
| 2011/0034586 A1 | 2/2011 | Buskila et al. |
| 2011/0166696 A1 | 7/2011 | Nigon |
| 2011/0283859 A1 | 11/2011 | Codemo |
| 2012/0003453 A1 | 1/2012 | Buskila et al. |
| 2012/0183735 A1 | 7/2012 | Moreno et al. |
| 2012/0283384 A1 | 11/2012 | Cox |
| 2013/0130036 A1 | 5/2013 | Bettiol et al. |
| 2013/0137810 A1 | 5/2013 | Shin |
| 2013/0196251 A1 | 8/2013 | Di Noto et al. |
| 2013/0341254 A1 | 12/2013 | Bauer |
| 2014/0141961 A1 | 5/2014 | Koszo |
| 2014/0335325 A1 | 11/2014 | Humphries |
| 2015/0064315 A1 | 3/2015 | van Blokland |
| 2015/0136311 A1 | 5/2015 | Mjelde |
| 2015/0314475 A1 | 11/2015 | Banus |
| 2015/0320035 A1 | 11/2015 | Trinder |
| 2015/0360507 A1 | 12/2015 | Benito |
| 2016/0052164 A1 | 2/2016 | Grzeskowiak, II et al. |
| 2016/0052333 A1 | 2/2016 | Grzeskowiak, II et al. |
| 2016/0052334 A1 | 2/2016 | Grzeskowiak, II et al. |
| 2016/0089818 A1 | 3/2016 | Xie |
| 2016/0221384 A1 | 8/2016 | Grzeskowiak, II et al. |
| 2016/0290852 A1 | 10/2016 | Chandler et al. |
| 2017/0066283 A1 | 3/2017 | Abou |
| 2017/0282457 A1 | 10/2017 | Burns |
| 2018/0243956 A1* | 8/2018 | Salenius ........... B29C 45/14065 |
| 2019/0283274 A1 | 9/2019 | Grzeskowiak, II et al. |
| 2019/0330113 A1 | 10/2019 | Chu |

FOREIGN PATENT DOCUMENTS

| | | |
|---|---|---|
| CN | 1184039 | 6/1998 |
| CN | 1718403 | 1/2006 |
| CN | 1301199 | 2/2007 |
| CN | 100463788 | 2/2009 |
| CN | 101564868 | 10/2009 |
| CN | 102049809 | 5/2011 |
| CN | 102050598 | 5/2011 |
| CN | 102806599 | 12/2012 |
| CN | 102950955 | 3/2013 |
| DE | 102010053520 | 2/2012 |
| EP | 0511545 | 11/1992 |
| EP | 0558247 | 9/1993 |
| EP | 0734819 | 10/1996 |
| EP | 0970790 | 1/2000 |
| EP | 1005967 | 6/2000 |
| EP | 1717000 | 11/2006 |
| EP | 1930142 | 6/2008 |
| EP | 1905749 | 7/2012 |
| EP | 2065150 | 3/2014 |
| EP | 2944443 | 11/2015 |
| EP | 3095768 | 11/2016 |
| ES | 2087313 | 7/1996 |
| ES | 2187313 | 6/2003 |
| ES | 2285150 | 11/2007 |
| GB | 2233640 | 1/1991 |
| JP | 2004270406 | 9/2004 |
| WO | WO 1989011457 | 11/1989 |
| WO | WO 2003027042 | 4/2003 |
| WO | WO 2006100321 | 9/2006 |
| WO | WO 2007080059 | 7/2007 |
| WO | WO 2008000168 | 1/2008 |
| WO | WO 2008015596 | 2/2008 |
| WO | WO 2009010406 | 1/2009 |
| WO | WO 2010097727 | 9/2010 |
| WO | WO 2014108582 | 7/2014 |
| WO | WO 2016028780 | 2/2016 |

OTHER PUBLICATIONS

Caesarstone.com [online], "Caesarstone Concetto—A Touch of Luxury", Caesarstone, No Date [retrieved on Apr. 7, 2021], retrieved from URL: http://www.caesarstone.com/spotlights/articles/caesarstone-collection-and-products/caesarstone-concetto-a-touch-of-luxury, 4 pages.
Stonesurfacesnj.com [online], "CaesarStone Concetto Exotic Surfaces", Caesarstone Concetto, available on Apr. 29, 2019, via Internet Archive: Wayback Machine URL: http://web.archive.org/web/20190429102351/https:/stonesurfacesnj.com/concetto/, [retrieved

(56) References Cited

OTHER PUBLICATIONS on Apr. 7, 2021], retrieved from URL: https://stonesurfacesnj.com/concetto/, 4 pages.

* cited by examiner

700

STONE SLABS, SYSTEMS, AND METHODS

CROSS-REFERENCE TO RELATED APPLICATIONS

This application claims priority to U.S. Application Ser. No. 62/956,611, filed on Jan. 2, 2020, which is fully incorporated herein by reference.

TECHNICAL FIELD

This document describes stone slab products, and systems and processes for forming stone slab products such as, for example, a processed stone slab that is formed into a predetermined slab shape from preformed slab sections, particulate mineral material, and/or other materials, and a resin binder, so that the stone slab is suitable for use in living or working spaces (e.g., along a countertop, table, floor, or the like).

BACKGROUND

Stone slabs are a commonly used building material. Granite, marble, soapstone, and other quarried stones are often selected for use as countertops due to their aesthetic properties. Stone slabs may also be formed from a combination of natural and other materials that can provide improved qualities such as aesthetic characteristics, reproducibility, and stain-resistant or heat-resistant properties. Stone slabs have been made from a combination of particulate mineral material and binder, such as a polymer resin or cement. Some stone slabs are manufactured to have a particular aesthetic appearance, such as an aesthetic appearance that has a predetermined pattern or design, emulates quarried stone, or that accentuates particular aesthetic features.

SUMMARY

Some embodiments described herein include systems and processes for forming stone slabs suitable for use in living or working spaces. In some optional embodiments, slabs can be manufactured by assembling a mosaic of preformed slab sections (e.g., remnants which may have been cut to smaller sizes). In some optional embodiments, slabs can be manufactured by assembling a mosaic of preformed slab sections. A resin is provided at seams between the slab sections to bond the slab sections together.

Example slabs, systems, and methods described herein can provide several advantages. First, various features and techniques described herein can facilitate efficient manufacturing of slab products. Slab products made from more than one, several, dozens, or more slab sections can be efficiently produced by bonding the slab portions to form the slab product.

Second, various slabs, systems, and methods described herein can provide slabs made from slab sections that have tight seams and high bond strength. For example, the seams can have a thickness that is a fraction of a width of individual slab sections while having a strength that is not substantially weaker than non-seam locations of the slab product.

Third, slabs can be formed from previously-formed material sections. For example, slab products described herein can be formed from recycled material sections. The recycled material sections (e.g., pre- or post-consumer recycled materials) may be previously-formed slab materials that have been partially used or partially damaged. In some embodiments, the recycled material sections may be cut into similarly sized sections from multiple, previously formed slabs that may have irregular or differing sizes. Techniques described herein can thus facilitate efficient use of materials, reduce waste, and promote reuse of previously-formed material sections that may have been discarded according to conventional processes.

Fourth, in some embodiments, multiple slabs can be formed that have similar overall appearance, pattern, etc., from a set of previously-formed material sections having differing appearances. For example, multiple previously-formed material sections having differing color characteristics can be cut into smaller sections, which can then be arranged according to a predetermined pattern or algorithm to create a set of slabs having similar or related appearances (e.g., by intermixing slab sections generated from different previously-formed material sections).

Fifth, some embodiments described herein facilitate automated processing steps that can limit the number of manual intervention while promoting formation of slab products having a customized appearance. According to some optional embodiments, a user-interface facilitates selection of a particular appearance, pattern, etc., of a major surface of a slab product.

Sixth, some example slab products can facilitate handling and installation in an installation environment. For example, slab products described herein can be cut to a desired geometry to accommodate a particular installation location, and installed in relatively large sections. In some optional embodiments, slab products described herein can provide a tiled or mosaic aesthetic appearance, while facilitating installation in a single or relatively few portions, thereby reducing labor at an installation location (e.g., as compared to installing tiles or tile sections joined by a flexible backing).

The details of one or more implementations are set forth in the accompanying drawings and the description below. Other features and advantages will be apparent from the description and drawings, and from the claims.

DETAILED DESCRIPTION

In general, this document describes systems and techniques in which slabs can be manufactured by arranging a selection or mosaic of preformed slab sections in an enclosure, and dispensing a resin into the enclosure. The resin can be drawn by the vacuum, across the mosaic and through the seams between the sections. In some embodiments, a particulate mineral mix can be dispensed into the enclosure in addition to, or instead of, the preformed slab sections.

Figure 1A:
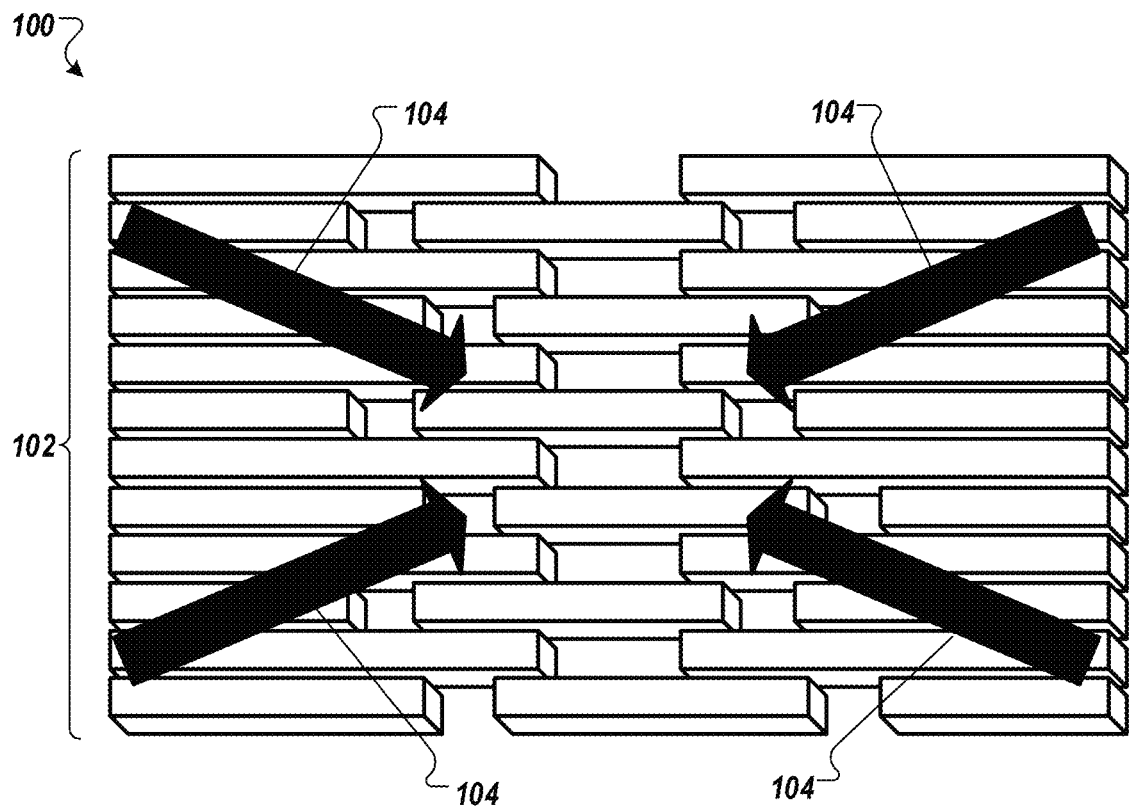
FIG. 1A shows a partly exploded front perspective view of an example stone slab product.

Referring to FIG. 1A, an example stone slab product 100 is shown that includes a collection of preformed slab sections 102. The slab sections 102 can variously comprise a quartz or other natural or simulated stone material, quarried stone, metal, ceramic, glass, wood, concrete, plastic, or combinations of these and/or other materials, arranged adjacent to each other in a mosaic or other arrangement, as represented by arrows 104.

Figure 1B:
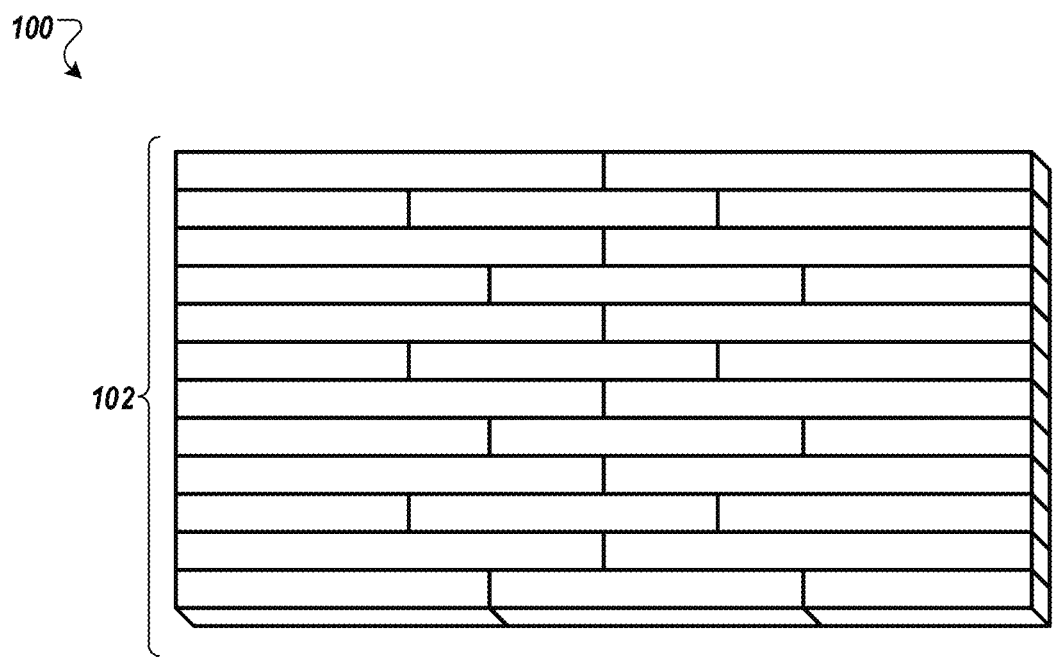
FIG. 1B shows a front perspective view of the example stone slab product of FIG. 1A in an assembled form.

In an assembled form, for example as shown in FIG. 1B, the slab sections 102 form the stone slab product 100. As will be discussed in the paragraphs to follow, the slab sections 102 may optionally be drawn together and bonded by a vacuum infusion of resin into seams defined between adjacent slab sections. Once assembled, compressed, infused with resin binder, and/or cured, the resulting stone slab product 100 is a hardened slab product suitable for use in living or working spaces (e.g., along a countertop, backsplash, table, floor, wall, or the like).

The stone slab product 100 may have a generally rectangular shape and be defined by a width W, length L, and thickness T. In some embodiments, the width W of the stone slab product 100 is at least 3 feet, between about 3 feet and 18 feet, or between about 4.5 feet and 7 feet, and the length L of the stone slab product 100 formed in the mold is at least 6 feet, and between about 6 feet and 24 feet, or between about 10 feet and 12 feet. For example, the stone slab product 100 may have a width of 4.5 feet and a length of 10 feet, or a width of 5.5 feet and a length of 11 feet. In some embodiments, the thickness T of the stone slab product 100 is at least 1 cm, between about 2.5 cm and 25 cm, or about 7.5 cm. For example, the thickness may be 1 cm, 2 cm, 3 cm, or more. The thickness T of the stone slab product 100 may be defined by a thickness of the slab sections 102. In an example embodiment, the thicknesses of the slab sections 102 can have the thickness T (e.g., such that the thickness of each slab section 102 is equal to the thickness T of the stone slab product 100).

FIGS. 2A-2F show an example of a process for the assembly of slab sections into a stone slab product using vacuum infusion. In some embodiments, the stone slab product can be the example stone slab product 100 of FIG. 1B.

Figure 2A:
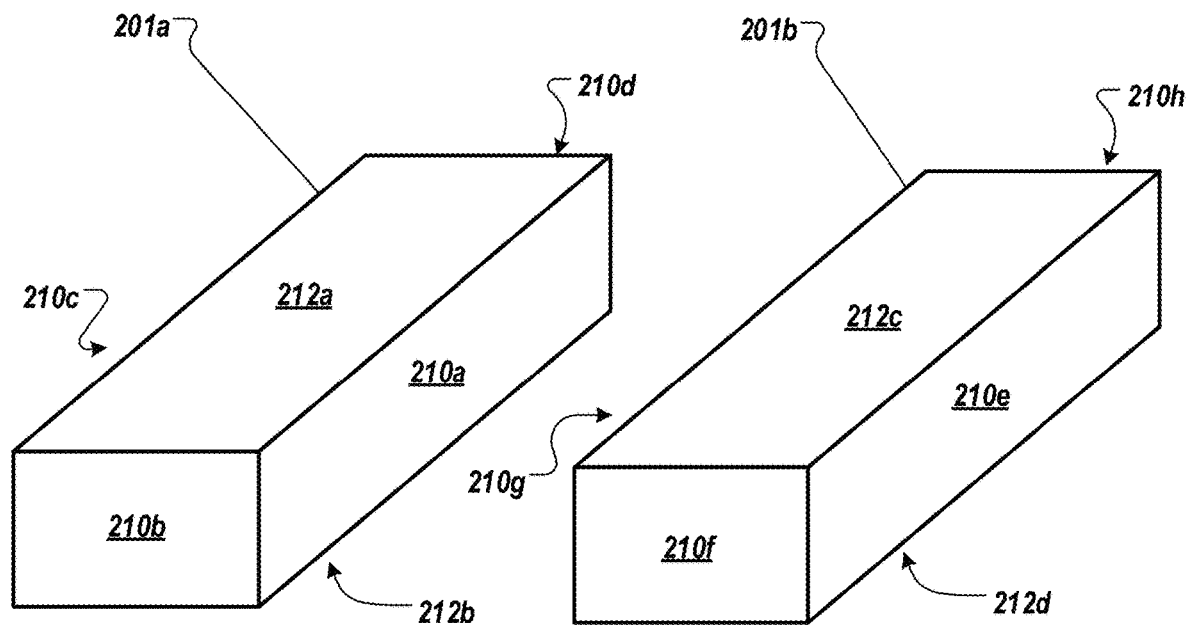
FIGS. 2A-2F show an example of a process for the assembly of slab sections into a stone slab product.

Referring now to FIG. 2A, a slab section 201a and a slab section 201b are shown. The slab sections 201a and 201b are solid, preformed shapes, such as elongated or rectangular block shapes. The slab sections 201a, 201b may be made of processed or quarried stone product, and/or other solid materials for inclusion as a section of the stone slab product. In some embodiments, the slab sections 201a and 201b can be cut or otherwise shaped from larger pieces of material, such as from a previously-made slab. For example, a previously-made slab may be recycled, repurposed, and/or otherwise reused by cutting portions of the slab including for example undamaged portions of the slab into the slab sections 201a and 201b for use in a new stone slab product. In some embodiments, the slab sections 201a, 201b may be cut from a larger, partial stone slab, such a stone slab that was previously cut or not for example a remnant. Alternatively or additionally, the previously-made slab may be damaged or otherwise not preferable for use in its entirety, and the slab sections 201a, 201b cut from undamaged portions of the previously-made slab.

The slab sections 201a and 201b are shaped with various faces or surfaces. The slab section 201a has a collection of lateral surfaces 210a-210d, and the slab section 201b has a collection of lateral surfaces 210e-210h. The slab section 201a has a major surface 212a and a major surface 212b, and the slab section 201b has a major surface 212c and a major surface 212d. The lateral surface 210a and the lateral surface 210g are cut or otherwise formed to matingly abut each other. In the illustrated example, the lateral surfaces 210a and 210g are shown as being flat and square, but in some embodiments the lateral surfaces 210a and 210b can be formed with any appropriate complimentary angles, curves, and/or compound shapes that will fit in close abutment to each other. Alternatively or in addition, larger gaps may remain between adjacent slab sections (e.g., according to a predetermined pattern or arrangement, due to complex geometry of the respective slab sections, etc.). In some embodiments large gaps may be filled by the resin and/or a particulate mineral mix.

Figure 2B:
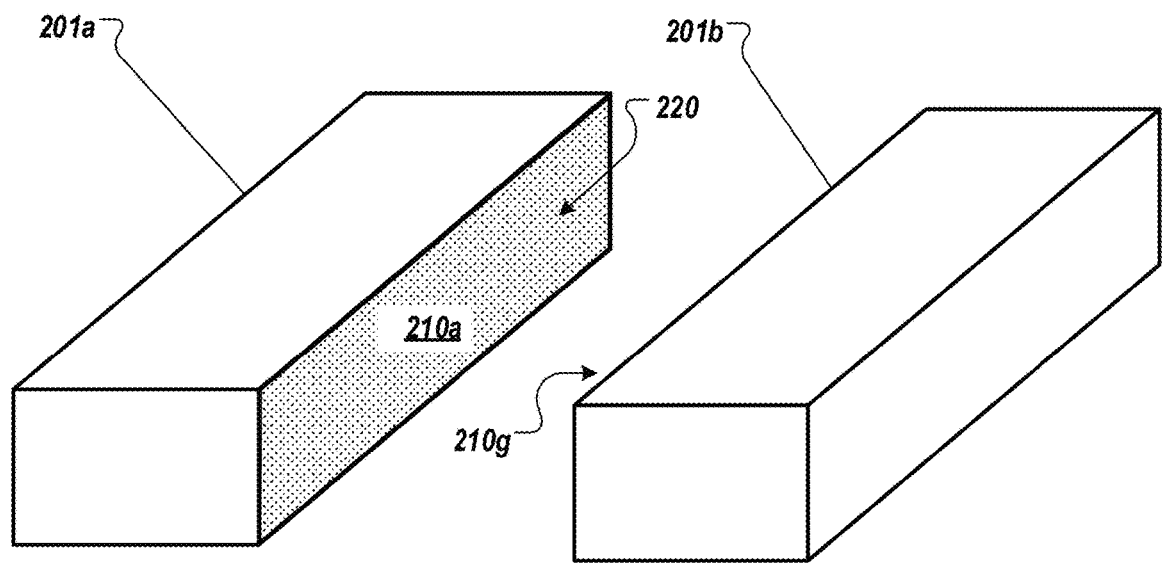

Referring now to FIG. 2B, the slab section 201a is prepared by applying a texture 220 the lateral surface 210a. The lateral surface 210g is also prepared with a similar texture (not visible in this view). The texture 220 may reduce the smoothness and/or increase the surface area of the lateral surfaces 210a, 210g (e.g., to promote binding of the lateral surfaces 210a, 210g with a resin binder, as will be discussed later in this document). In some embodiments, the texture 220 can be applied by abrasion (e.g., sanding, grinding), chemical etching (e.g., solvents), heat (e.g., laser etching), and/or other processes for texturizing a smooth surface of a stone slab product.

Figure 2C:
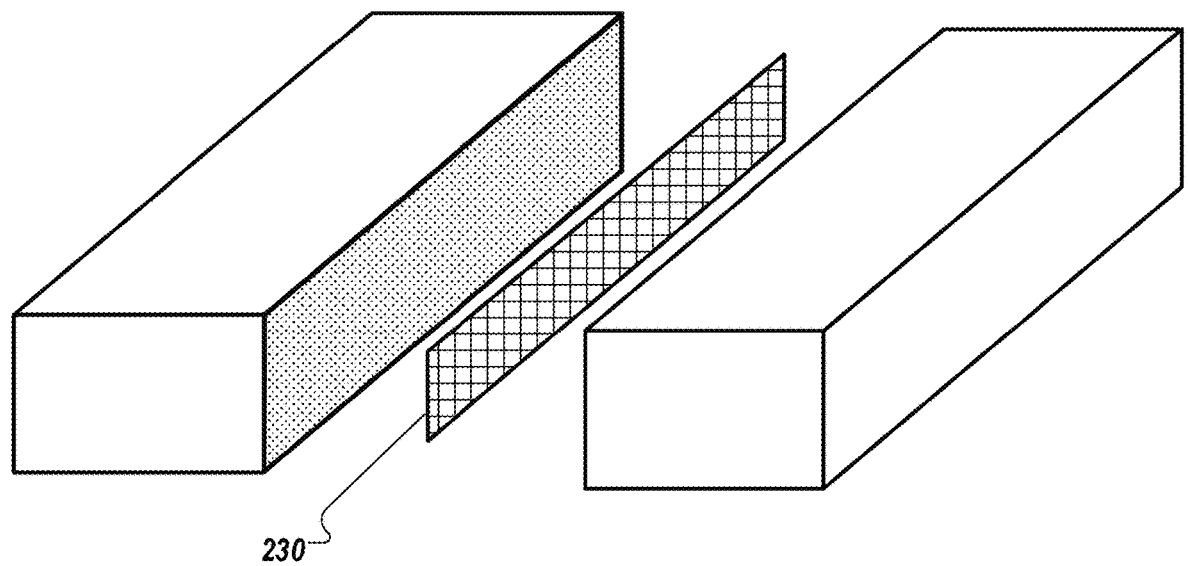

Referring now to FIG. 2C, a spacer 230 is provided. In some embodiments, the spacer 230 is a thin, loosely spaced mesh of fibers (e.g., fiberglass strands woven in a 1-2 millimeter web). In some embodiments, the spacer 230 is a thin layer of fibrous material (e.g., paper). In general, the spacer is provided to promote a consistent, but small spacing (e.g., small relative to a width of the slab sections) between abutting faces of slab sections.

Figure 2D:
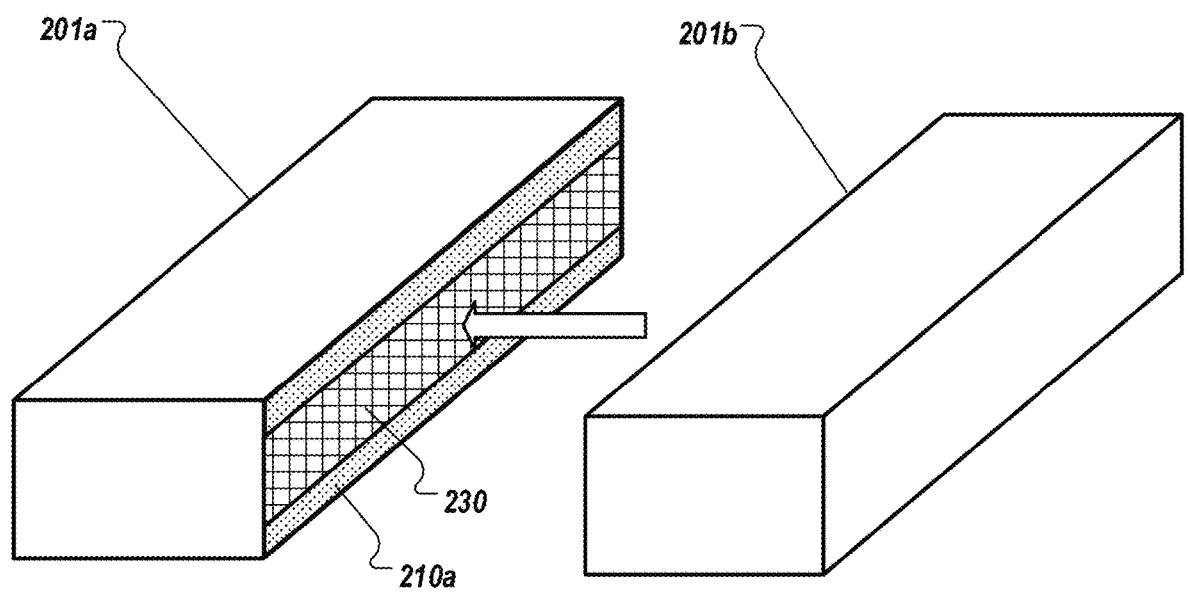

Referring now to FIG. 2D, the spacer 230 is applied to the lateral surface 210a. In some embodiments, the spacer 230 can be adhered to the lateral surface 210a to keep it in position for subsequent assembly operations. For example, a liquid adhesive may be sprayed, brushed, rolled, or otherwise applied to the lateral surface 210a, and then the spacer 230 may be pressed against the adhesive. Alternatively or additionally, the spacer 230 may be wetted with an adhesive and then pressed against the lateral surface 210a. In some embodiments, the spacer 230 may be pre-formed with an adhesive layer (e.g., a sticky backing similar to an adhesive tape).

Figure 2E:
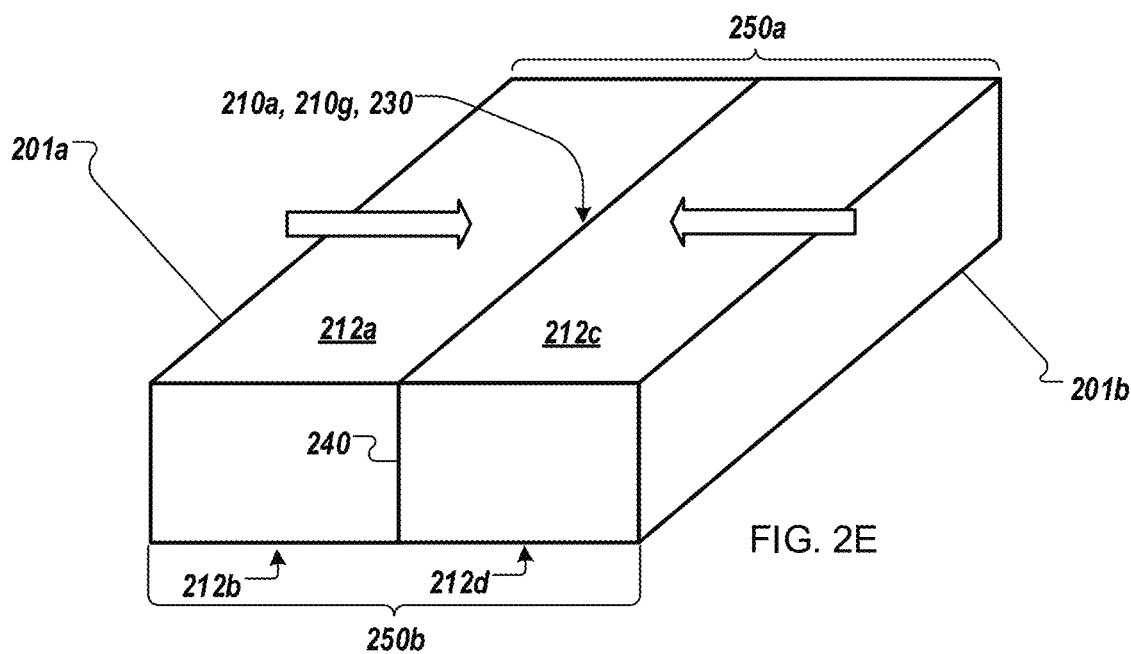

Referring now to FIG. 2E, the slab section 201a and the slab section 201b are arranged such that the lateral surface 210a and the lateral surface 210g are brought into proximity with each other with the spacer 230 (concealed between slab sections in this view) layered in-between. The proximate (e.g., abutting) lateral surfaces 210a and 210g define a seam 240 with the spacer 230 inside. In the illustrated example, the major surface 212a and the major surface 212c combine to form a major surface 250a.

Figure 2F:
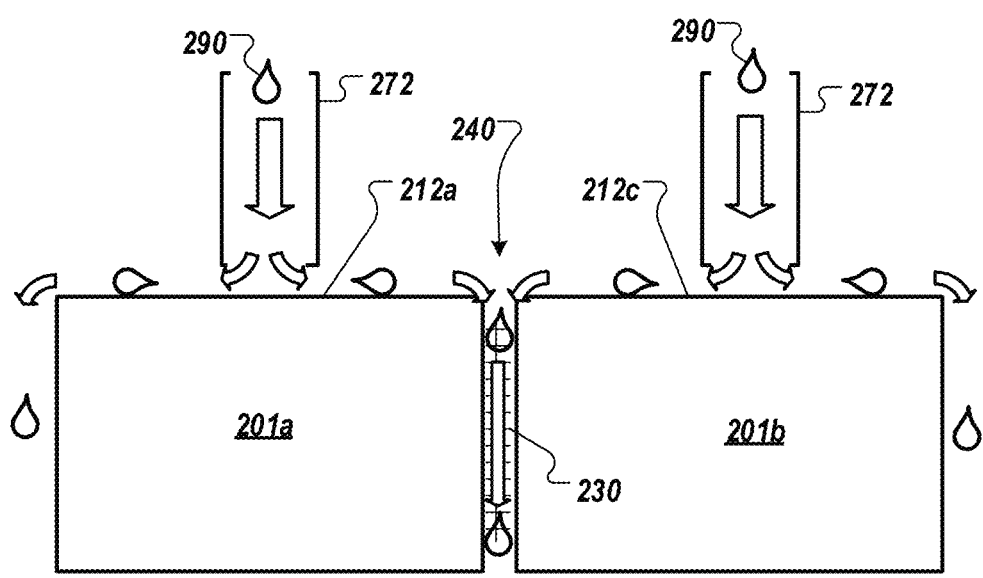

Referring now to FIG. 2F, a liquid resin binder 290 is dispensed to bond the slab sections along seam 240, which is partly spaced open by the spacer 230.

The liquid resin binder 290 can include organic and inorganic materials that can link the adjacent slab sections, for example, mono-functional or multifunctional silane molecules, dendrimeric molecules, and the like, that may have the ability to bind the organic and inorganic components of the composite stone mix. The binders may further include a mixture of various components, such as initiators, hardeners, catalysators, binding molecules and bridges, or any combination thereof.

After application, the liquid resin binder 290 is cured to become a solid binder. The slab sections 201*a* and 201*b* are bound together, forming a stone slab product. In subsequent steps, a polishing process is performed to remove hardened residual liquid resin binder 290 and/or to correct any unevenness between the major surfaces 212*a* and 212*c* (e.g., when the major surface 250*a* is to be the exposed, functional surface of the resulting stone slab product).

In the illustrated examples, the slab sections 201*a* and 201*b* are illustrated as being rectangular, but in some examples the slab sections 201*a* and 201*b* can be any other appropriate shape(s). Furthermore, while only two of the slab sections 201*a* and 201*b* were shown and described, any appropriate number of slab sections can be arranged using a similar process (e.g., the example stone slab product 100 of FIG. 1B includes a large number of the slab sections 102). For example, slab sections of various shapes, colors, and materials can be shaped and arranged as a mosaic or other predetermined or random pattern. In other examples, slab sections can be arranged to form other predetermined designs (e.g., images, logos, lettering).

Figure 3:
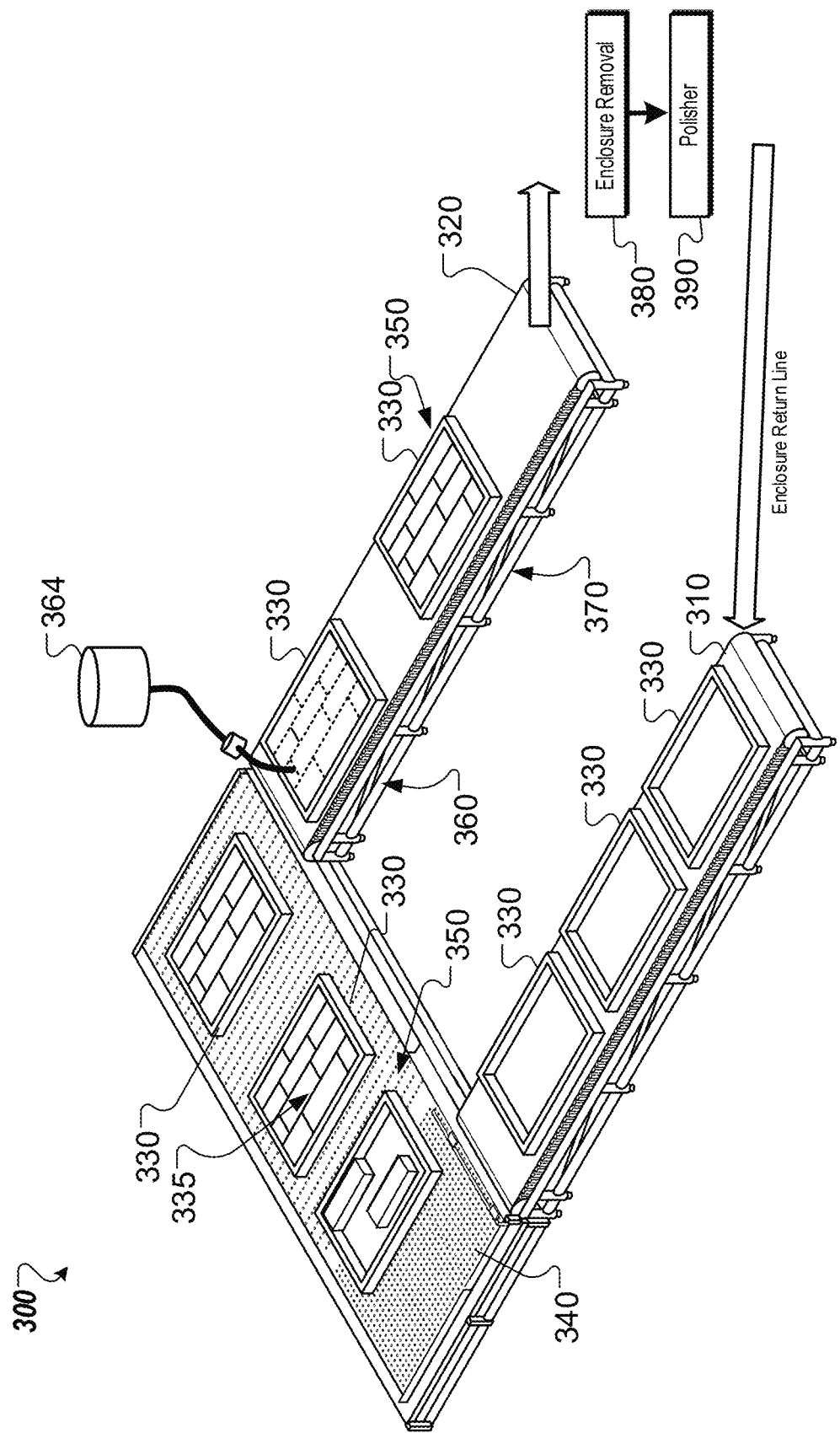
FIG. 3 is a diagram of an example system that can be used to form a stone slab product.

Referring now to FIG. 3, a system 300 for forming a set of stone slab products (e.g., stone slab product 100 (FIG. 1B)) is shown. The system 300 may be configured so that slab sections may be sequentially arranged within an enclosure, and contents of the enclosure may be joined by resin binder. The contents of the enclosure may then be processed in a subsequent compression molding operation (e.g., vibrio-compaction molding, vacuum-compaction molding, curing, etc.). The system 300 includes an input conveyor 310 and an output conveyor 320. A collection of enclosures 330 are transported on the input conveyor 310 and the output conveyor 320 between various operations in a process of manufacturing the stone slab products. The enclosures 330 define a mold cavity having a width between about 3 feet and 18 feet, or between about 4.5 feet and 7 feet, and a length L that is at least 6 feet, and between about 6 feet and 24 feet, or between about 10 feet and 12 feet, and a thickness that is at least 1 cm, between about 2.5 cm and 25 cm, or about 7.5 cm. The input conveyor 310 may transport the enclosure 330 to an air table 340. The air table 340 includes a collection of outlets formed on a top surface. Air pumped through the outlets forms a cushion of air between the top surface and the enclosure 330, to facilitate movement and/or orientation of the enclosures 330. In some embodiments, the enclosure 330 can be defined partly or wholly by slab sections (e.g., a mold for an arrangement of slab sections can be made out of other slab sections).

Still referring to FIG. 3, the system 300 also includes a slab section arrangement station 350. At the station 350, slab sections are arranged in a manner similar to that discussed in the descriptions of FIGS. 2A-2F. In some embodiments, the slab sections can be arranged manually. In some embodiments, the slab sections can be arranged automatically (e.g., by a pick and place robot, according to a predetermined pattern or algorithm). In some example embodiments, sequential enclosures may be filled according to the same predetermined pattern or algorithm, to define slabs having the same or related appearance. Alternatively or additionally, sequential enclosures may be filled according to different predetermined patterns. In some example embodiments, the predetermined pattern may be customized by a purchaser of the resulting slab, end-user, etc., such as through a graphical user interface on a computing device, mobile phone, or other interface. The arrangement of materials within the closure, and the appearance of the finished slab product, may be highly customized to have a particular pattern, image, emblem, or other predetermined aesthetic appearance, while promoting an efficient and highly-automated manufacturing process.

The enclosure 330 is moved horizontally (e.g., relative to gravity) to a binder dispensation station 360. At the binder dispensation station 360, a liquid resin binder is dispensed to bind respective slab sections.

At the binder dispensation station 360, liquid resin binder is allowed to flow from the liquid resin binder dispenser 364 into and through the seams in the arrangement 335.

The enclosure 330 is moved horizontally (e.g., relative to gravity) to a curing station 370. At the curing station 370, the arrangement 335, infused with the liquid resin binder, is allowed to cure (e.g., harden) and form a stone slab product (e.g., the stone slab product 100 of FIG. 1B).

The enclosure 330 is then removed from the cured arrangement 335 at an enclosure removal station 380. In the illustrated example, the enclosure 330 can then be cleaned and otherwise prepared for reuse on the input conveyor 310.

Then, the hardened and cured slab is moved to a polisher station 390, in which a major surface of the slab is polished to remove residual manufacturing materials (e.g., hardened resin on the major surfaces) and form a smooth finish, thereby providing an appearance of the visible patterns provided by the arrangement 335 of slab sections. In some embodiments, the slab can be partly removed at polisher station 390 by polishing, cutting, or planing. The polished major surface of each of the stone slabs provides an outer appearance in which the visible patterns, imagery, striations, and/or veining patterns are at least partly visible.

In some implementations, the process may be performed in a different order. For example, in some implementations, the enclosure can be removed prior to curing. In some implementations, the slab can be made partly or entirely of a particulate mineral mix that is dispensed (e.g., via a particulate mineral dispenser) into the enclosure 330 and infused with liquid resin binder. In some embodiments, the slab can also include other materials or layers that reinforce and/or strengthen the composite slab, such as a functional mesh layer, paper, wood, plastic, composite materials, or any other appropriate materials that can reinforce or strengthen the composite slab.

Figure 4:
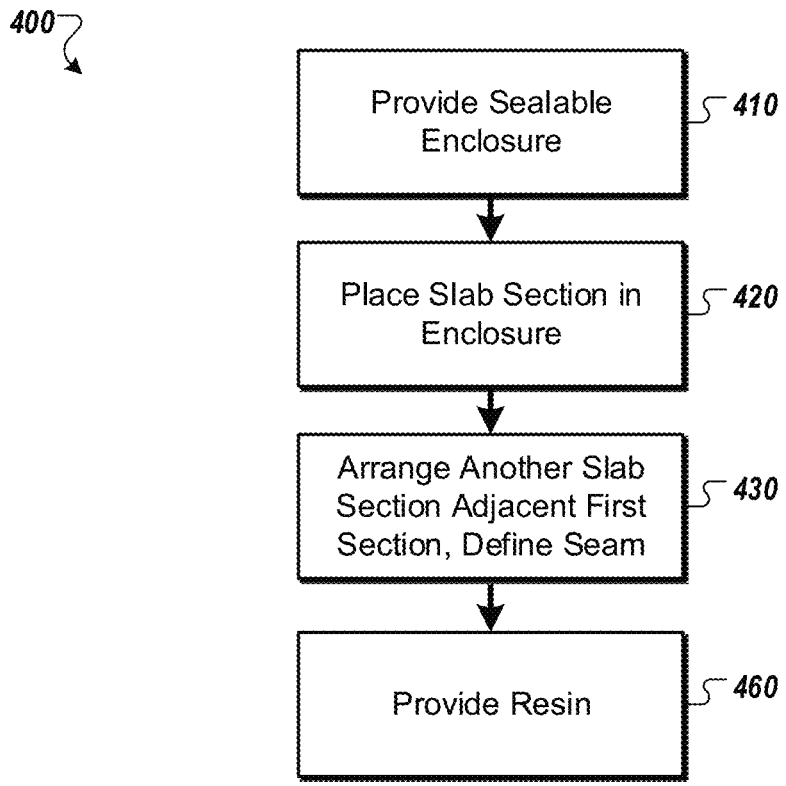
FIG. 4 is a flow diagram of an example process for forming a stone slab product.

FIG. 4 is a flow diagram of an example process 400 for forming a stone slab product, such as the stone slab product 100 of FIG. 1B.

At 410 an enclosure is provided.

At 420, a first slab section comprising a first surface is placed within the enclosure. For example, the slab section 201*a* can be arranged within the enclosure.

At 430, a second surface of a second slab section is arranged adjacent the first surface within the enclosure, such that a seam is defined between the first surface and the second surface. For example, the slab section 201*b* is arranged proximal the slab section 201*a*, such that the lateral surfaces 210*a* and 210*g* are abutted and define the seam 240.

In some embodiments, at least one of the first slab section and the second slab section can be formed of one or more of simulated stone slab, quarried stone slab, metal, glass, wood, ceramic, plastic, concrete, and cement. For example, the arrangement can include different stone colors and/or different materials to form a visual design in the stone slab product.

In some embodiments, at least one of the first surface and the second surface can be textured prior to being arranged. For example, the texture can be applied to the lateral surface and/or the lateral surface (e.g., to remove smoothness, to impart a roughness).

In some embodiments, the process 400 can also include arranging a spacer within the seam. For example, the spacer can be inserted between the lateral surfaces of respective slab sections. In some embodiments, the spacer can be a mesh of fiber strands (e.g., a loose web of fiberglass threads). In some embodiments, the spacer can be a fibrous sheet (e.g., paper or cloth).

At 460, a resin is provided at an inlet of the enclosure. For example, the liquid resin binder 290 can be provided. In another example, liquid resin binder can be dispensed by a liquid resin binder dispenser.

Figure 5:
FIGS. 5, 6, and 7 show photorealistic images of example stone slab products formed in accordance with example systems and techniques described herein.
Figure 6:
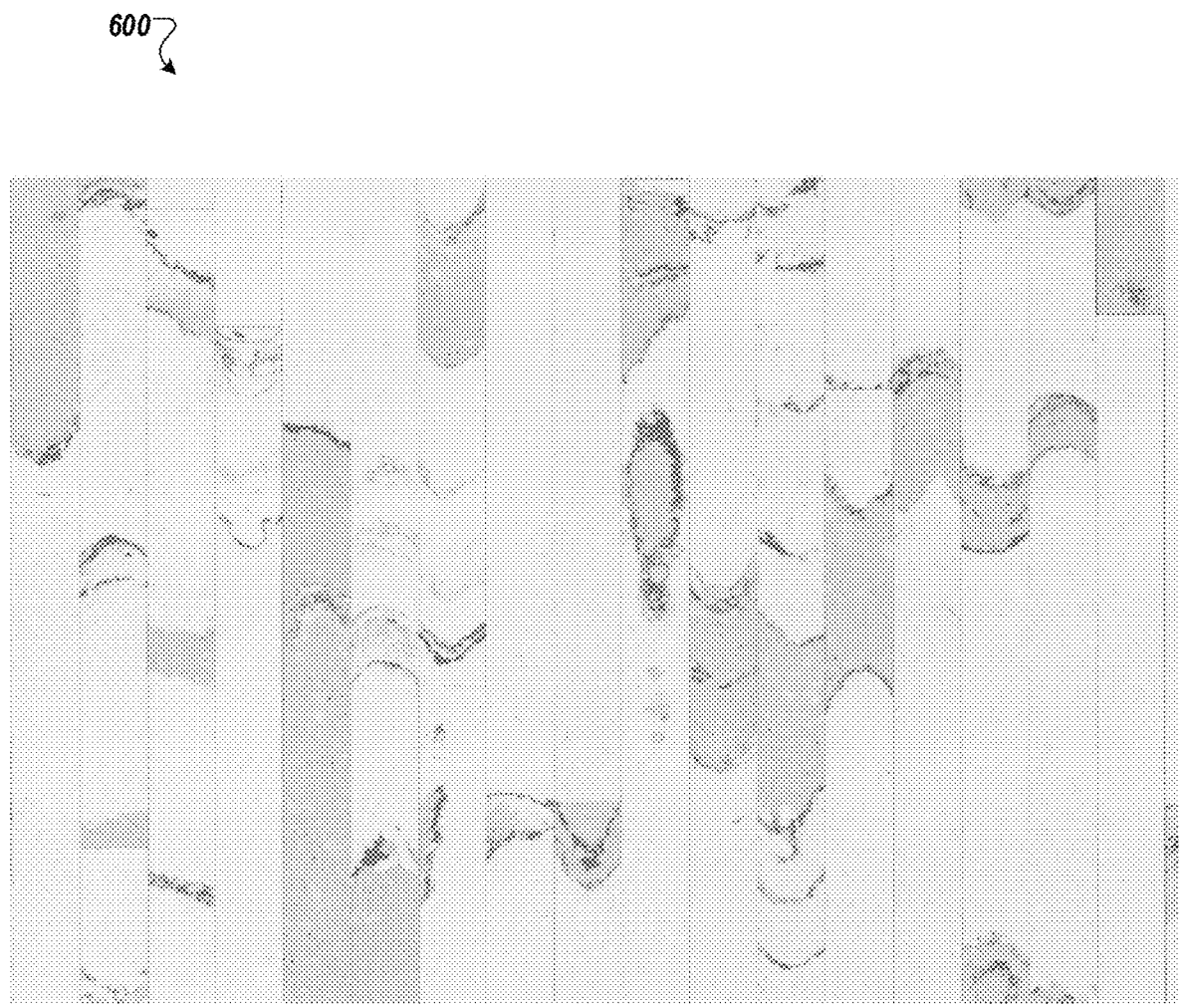
Figure 7:
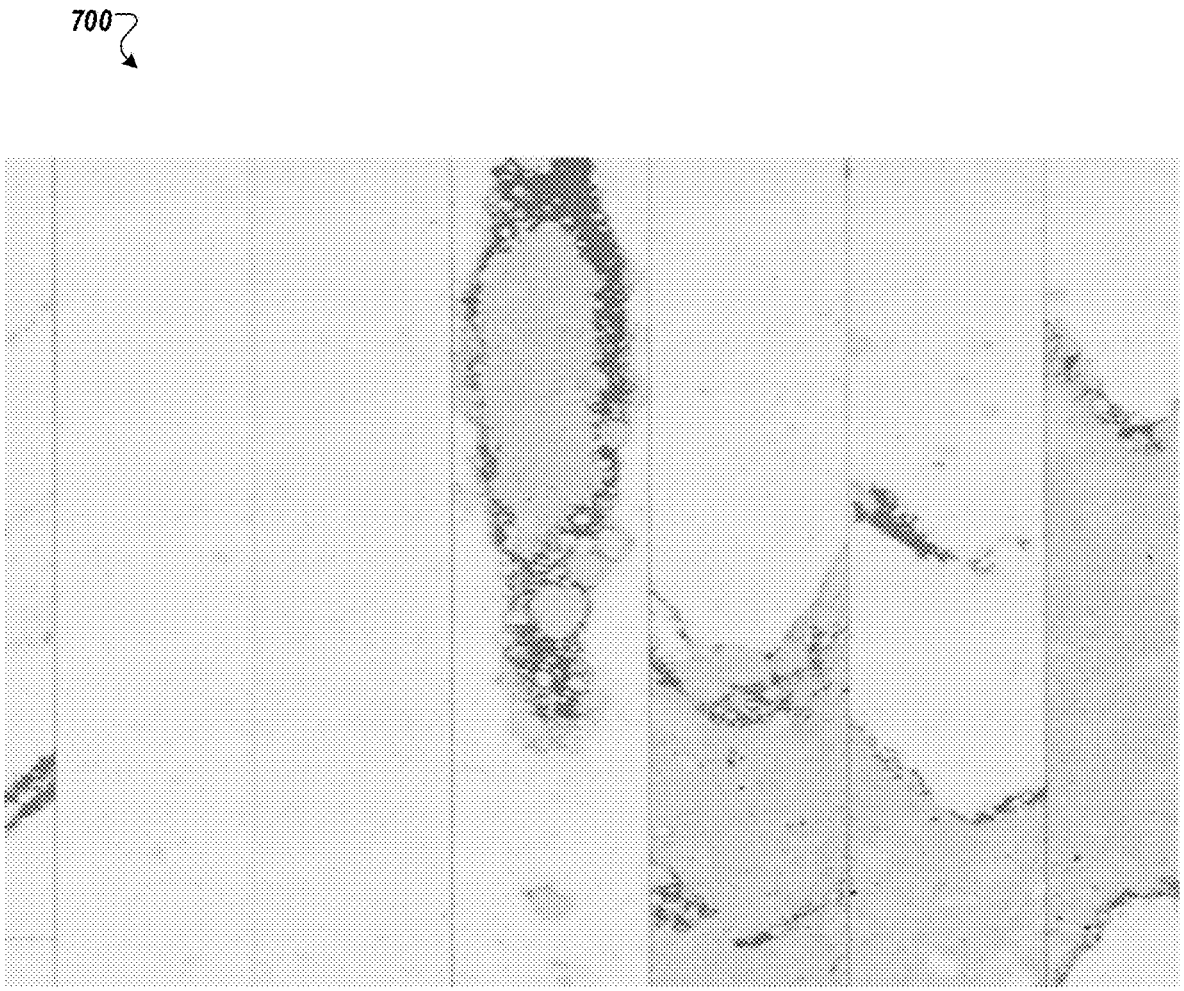

FIGS. 5, 6, and 7 show photorealistic images of example stone slab products 500, 600, and 700 formed in accordance with the systems and techniques described in this document.

Figure 8A:
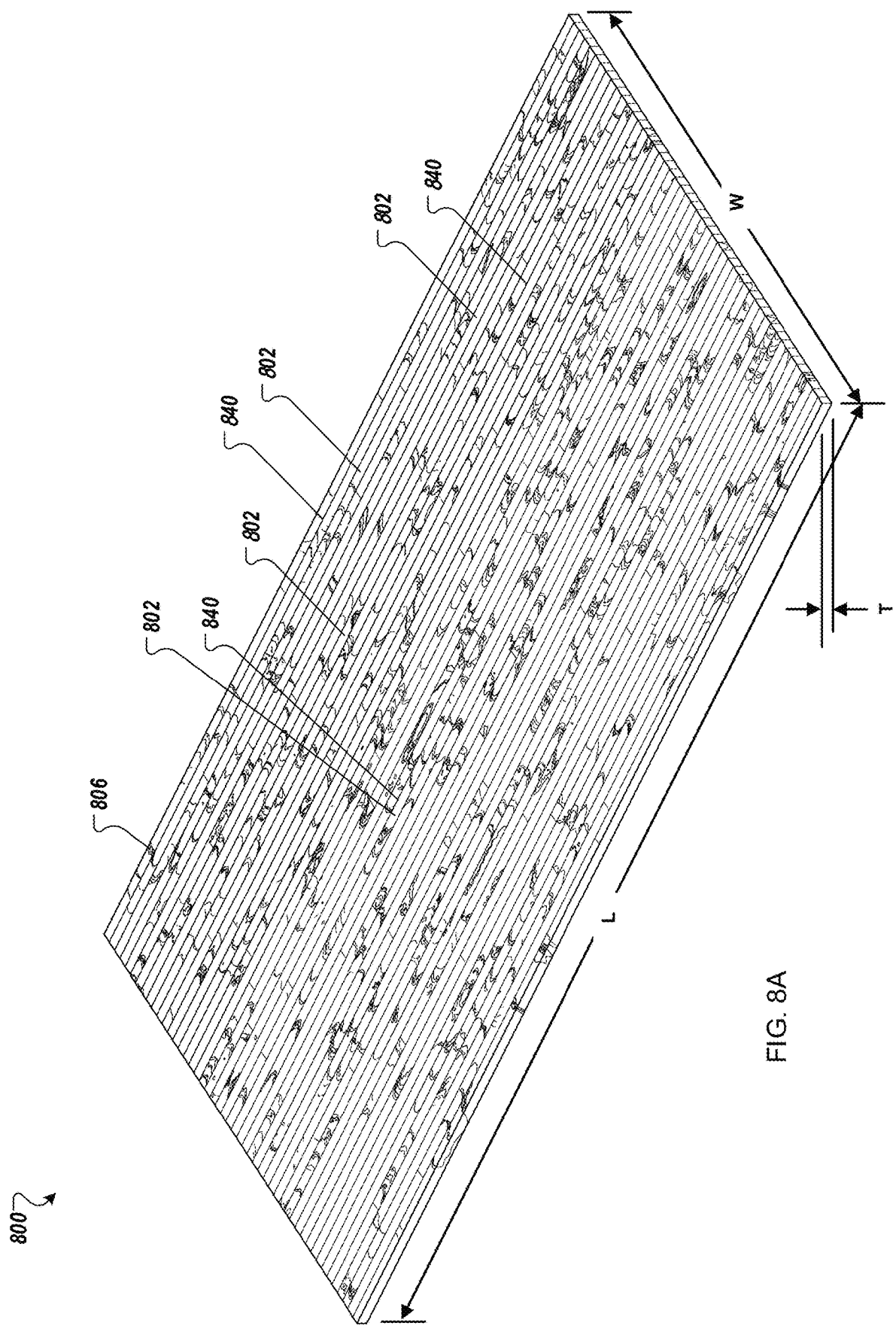
FIGS. 8A and 8B show an example slab product formed in accordance with example systems and techniques described herein.
Figure 8B:
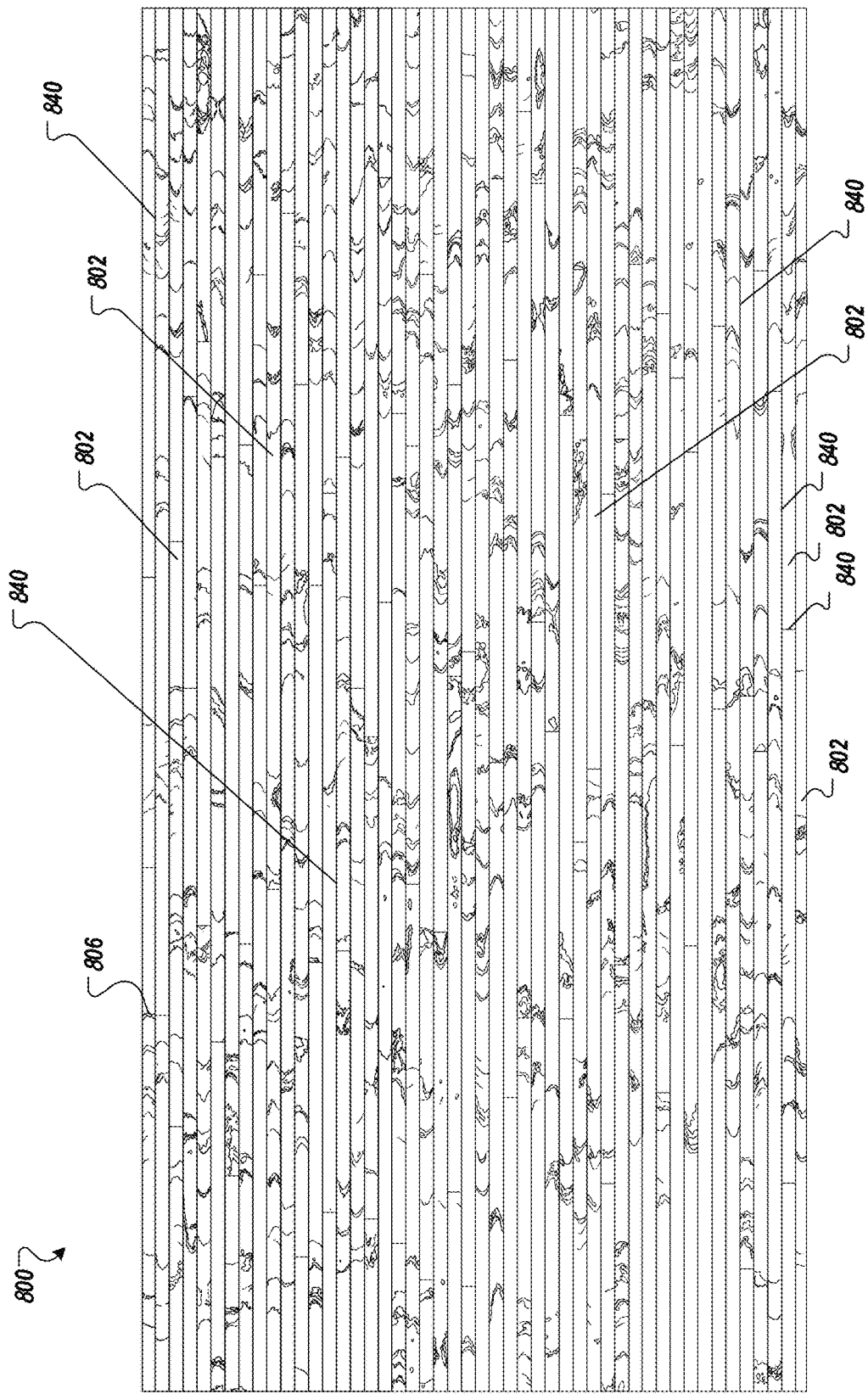

FIGS. 8A and 8B show an example slab product 800 formed in accordance with various systems and/or techniques described herein. Slab 800 includes a plurality of slab sections 802. In an example embodiment, the slab sections 802 include predominantly quartz material, and are formed form previously-formed slab products cut into a predetermined shape. For example, the slab sections may have an elongated rectangular shape that defines rectangular top and bottom surfaces and a square or rectangular cross-section. Alternatively or additionally, one or more of the slab sections 802 that define the slab product may include other quarried or simulated stone material, metal, ceramic, glass, wood, concrete, plastic, or combinations of these and/or other materials.

The slab product 800 may have a generally rectangular shape and be defined by a width W, length L, and thickness T. In some embodiments, the width W of the slab product 800 is at least 3 feet, between about 3 feet and 18 feet, or between about 4.5 feet and 7 feet, and the length L of the slab product 800 is at least 6 feet, and between about 6 feet and 24 feet, or between about 10 feet and 12 feet. For example, the slab product 800 may have a width of 4.5 feet and a length of 10 feet, or a width of 5.5 feet and a length of 11 feet. In some embodiments, the thickness T of the slab product 800 is at least 1 cm, between about 2.5 cm and 8 cm, or about 7.5 cm. For example, the thickness may be 1 cm, 2 cm, 3 cm, or more. The thickness T of the slab product 800 may be defined by a thickness of the slab sections 802. In an example embodiment, the thicknesses of the slab sections 802 can have the thickness t (e.g., such that the thickness of each slab section 802 is equal to the thickness T of the stone slab product 800).

In an example embodiment, the slab product 800 includes perceptible seams 840. The seams 840 are present between adjacent slab sections 802, and include a hardened resin binder that bonds the adjacent slab sections 802. The seams 840 can contribute to a tiled or mosaic aesthetic appearance (e.g., by presenting a visually-perceptible boundary between adjacent slab sections 802). In an example embodiment, the seams 840 include a same pigment or coloration as binder material of the slab sections 802. Alternatively or additionally, the seams 840 include a pigment that contrasts with a color of the slab sections 802 to further accentuate the visual appearance of the seams 840.

In various example embodiments, the seams 840 are relatively thin while providing a robust bond between adjacent slab sections 802. In an example embodiment, an average width of the seams 840 is less than 10%, less than 5%, less than 3%, less than 2%, or less than 1% of a width of a major face of the slab sections 802 (e.g. a respective slab section 802 bonded at the seam 840).

In an example embodiment, the seams 840 include additional material components that are not present within the slab sections 802. For example, a spacer may be present in slab product 840 at locations of the seams 840 between adjacent slab sections 802. The spacer component is not present within respective slab sections 802, and is only present within locations of seams 840, in some example embodiments. The spacer may include a thin, loosely spaced mesh of fibers (e.g., fiberglass strands woven in a 1-2 millimeter web). In some embodiments, the spacer is a thin layer of fibrous material (e.g., paper). In general, the spacer may facilitate a consistent width of seams 840 (e.g., consistent spacing between adjacent slab sections 802).

The slab sections 802 are arranged according to a predetermined pattern or algorithm that contributes to the aesthetic appearance of slab product 800. In an example embodiment, slab sections 802 include a plurality of slab sections that have a similar or related aesthetic appearance, such as slab sections 802 cut from the same or similar (e.g., similar style, model, color etc.) previously formed slab product. For example, the slab sections may have similar color characteristics, veining, gloss, tonality, etc. In an example embodiment, one or more slab sections 802 include vein portions 806 that extend across a width of the slab section 802 and/or through an entire thickness of the slab section 802. The vein portions may extend across a face of a slab section 802 between seams 840 on opposing sides of the slab section. The vein portions 806 thus may not extend across seams 840 and/or may otherwise have the appearance of being bounded within seams 840. A slab product 800 formed by an arrangement of slab sections 802 each having vein portions 806 may contribute to a tiled or mosaic overall appearance, while having consistent color characteristics, gloss, tonality, etc. across a major face of the slab product 800.

The slab sections 802 may have the same or different dimensions. For example, each slab section 802 that defines a portion of a major face of the slab product 800 may have the same dimensions (e.g., that defines an elongated block shape having rectangular major faces and a square cross-section). Alternatively or additionally, slab product 800 may include slab sections 802 having differing dimensions, such that some slab sections 802 have relatively larger or smaller major faces, different shaped major faces (e.g., square, rectangular, triangular, circular, elliptical, polygonal, etc.). The dimensions and/or positioning of respective slab sections 802 may be selected and arranged according to a predetermined pattern or algorithm to contribute to the overall aesthetic appearance of the slab product 800.

Figure 9A:
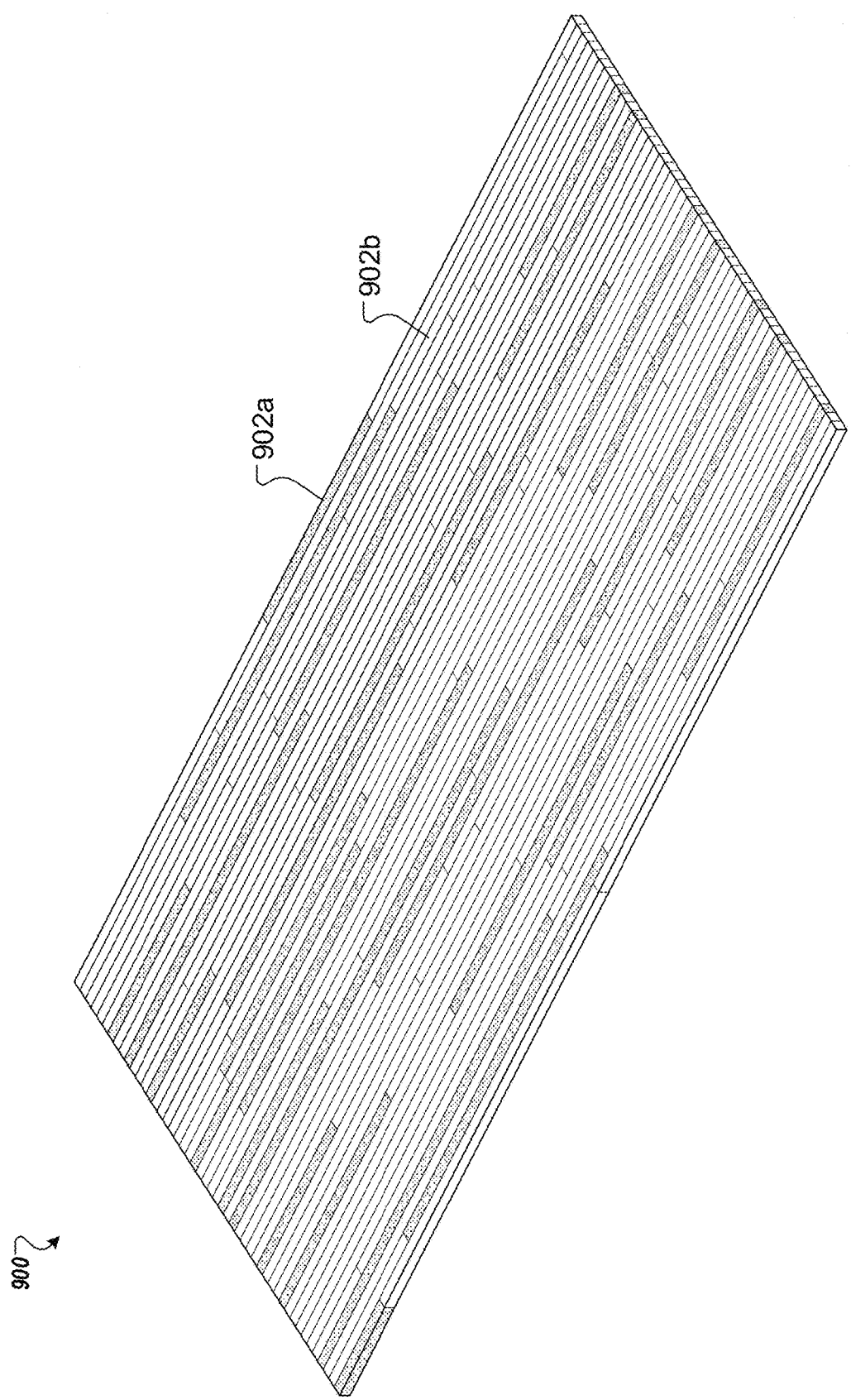
FIGS. 9A and 9B show another example slab product formed in accordance with example systems and techniques described herein.
Figure 9B:
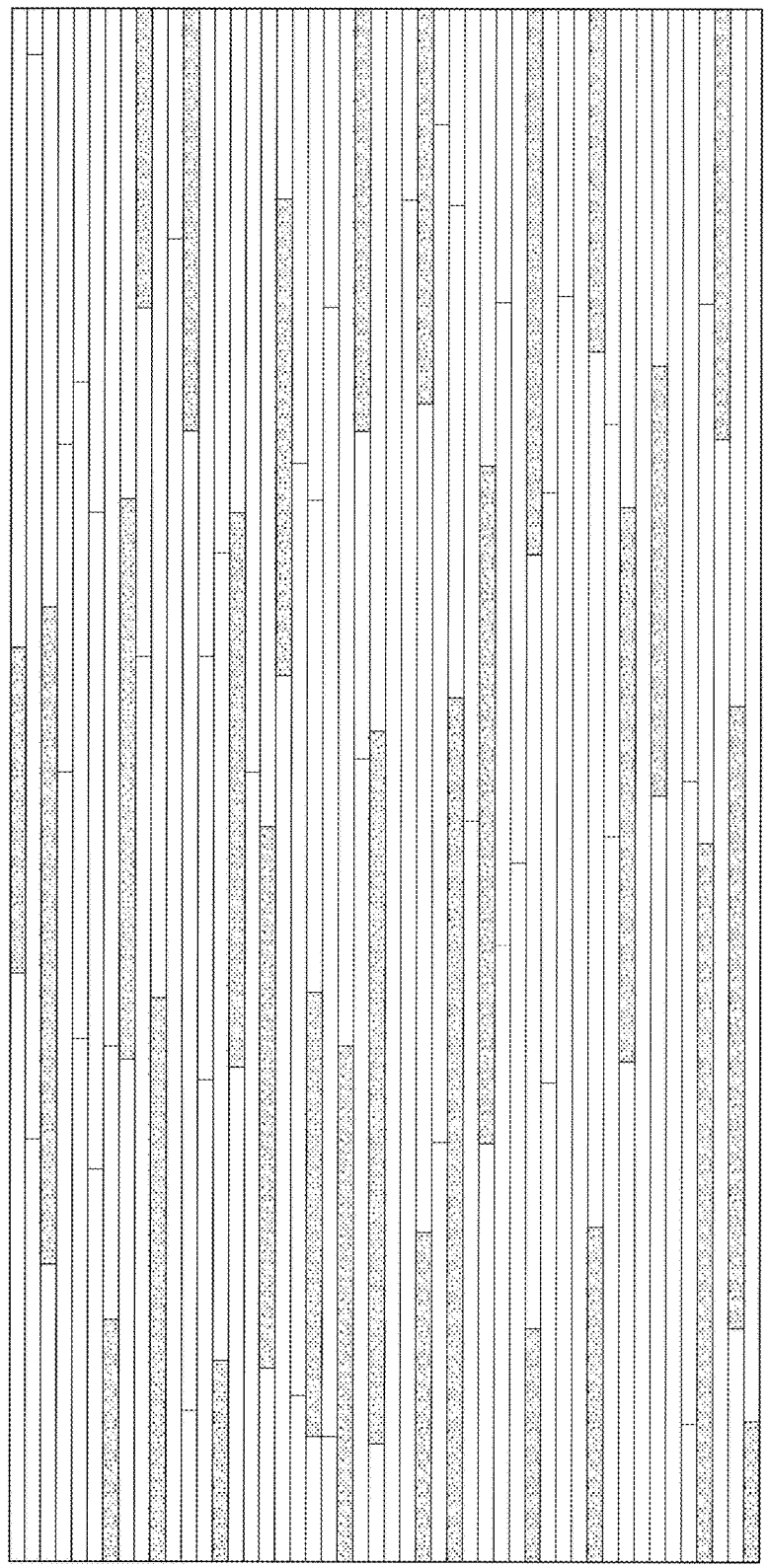

FIGS. 9A and 9B show another example slab product formed in accordance with example systems and techniques described herein. In various example embodiments, slab 900 may have one or more features as described above (e.g., with reference to FIGS. 1A-8B).

In some embodiments, slab product 900 includes a plurality of slab sections 902a, 902b that differ in at least one characteristic. For example, slab sections 902a may be formed of a first material and 902b may be formed of a second material different than the first material. In some embodiments, slab sections 902a are differently pigmented compared to slab sections 902b. Slab sections 902a, 902b, can be selectively positioned according to a predetermined pattern or algorithm to provide a slab product 900 having a predetermined aesthetic appearance. In various example embodiments, the slab sections 902a, 902b, can be arranged to provide the appearance of random placement, a regular or repeating pattern, a particular shape or image, emblem, logo, etc. Alternatively or additionally, the sizes of individual slab sections 902a, 902b may vary to generate a predetermined design.

While this specification contains many specific implementation details, these should not be construed as limitations on the scope of any technology described herein or of what may be claimed, but rather as descriptions of features that may be specific to particular embodiments. Certain features that are described in this specification in the context of separate embodiments can also be implemented in combination in a single embodiment in part or in whole. Conversely, various features that are described in the context of a single embodiment can also be implemented in multiple embodiments separately or in any subcombination. Moreover, although features may be described herein as acting in certain combinations and/or initially claimed as such, one or more features from a claimed combination can in some cases be excised separate from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Although a number of implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A process of forming a slab product, comprising:
    placing a first slab section, comprising particulate mineral mix and cured resin binder, and defining a first surface within an enclosure;
    arranging a second surface of a second slab section, comprising particulate mineral mix and cured resin binder, adjacent the first surface within the enclosure, such that a seam is defined between the first surface and the second surface;
    drawing at least a partial vacuum at an outlet of the enclosure;
    providing a resin at an inlet of the enclosure;
    drawing, by the partial vacuum, the resin through the seam; and
    curing the resin to bond the first surface to the second surface.

2. The process of claim 1, further comprising texturing at least the first surface or the second surface.

3. The process of claim 1, further comprising arranging a spacer adjacent the first surface.

4. The process of claim 3, wherein the spacer is a mesh of fiber strands.

5. The process of claim 1, wherein at least one of the first slab section and the second slab section further comprises one or more of simulated stone slab, quarried stone slab, metal, glass, wood, ceramic, plastic, concrete, and cement.

6. The process of claim 1, wherein the inlet comprises at least a first inlet to the enclosure and a second inlet to the enclosure spaced apart from the first inlet, and providing the resin at the inlet of the enclosure comprises:
    opening the first inlet from closed to permit the resin to flow through the first inlet and at least partly fill a first portion of the seam; and
    opening the second inlet from closed to permit the resin to flow through the second inlet and at least partly fill a second portion of the seam.

7. The process of claim 4, wherein the mesh of fiber strands is arranged as a fibrous sheet.

8. A process of forming a stone slab, comprising:
    positioning a plurality of cured stone slab portions into an enclosure having at least one fluid inlet and at least one fluid outlet, each of the cured stone slab portions comprising a particulate mineral mix and a cured resin binder, and defining a front surface and a rear surface;
    flowing a resin binder from the at least one fluid inlet to fill interfaces between each of the plurality of cured stone slab portions; and
    curing the resin binder to form a processed slab that has a front major surface defined by front surfaces of the plurality of cured stone slab portions, and a rear major surface.

9. The process of claim 8, wherein the plurality of cured stone slab portions extend through an entire thickness of the processed slab, and wherein front surfaces and rear surfaces of the plurality of cured stone slab portions define the front major surface and the rear major surface of the processed slab.

10. The process of claim 8, wherein the processed slab does not include a matting layer.

11. The process of claim 8, further comprising arranging a spacer between two of the plurality of cured stone slab portions.

12. The process of claim 11, wherein the spacer is a mesh of fiber strands.

13. The process of claim 8, wherein the at least one fluid inlet comprises at least a first inlet to the enclosure and a second inlet to the enclosure spaced apart from the first inlet.

14. The process of claim 13, wherein flowing the resin binder from the at least one fluid inlet comprises opening the first inlet to permit the resin binder to flow through the first inlet and at least partly fill a first portion of the interfaces.

15. The process of claim 14, wherein flowing the resin binder from the at least one fluid inlet further comprises opening the second inlet from closed to permit the resin binder to flow through the second inlet and at least partly fill a second portion of the interfaces.

16. The process of claim 12, wherein the mesh of fiber strands is arranged as a fibrous sheet.

* * * * *